No. 692,323. Patented Feb. 4, 1902.
P. MARINE.
ART OF MAKING FROZEN CONFECTIONS.
(Application filed May 3, 1901.)
(No Model.)
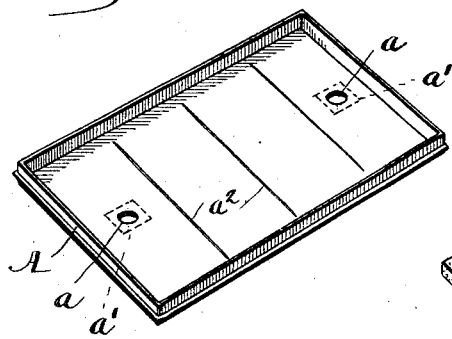
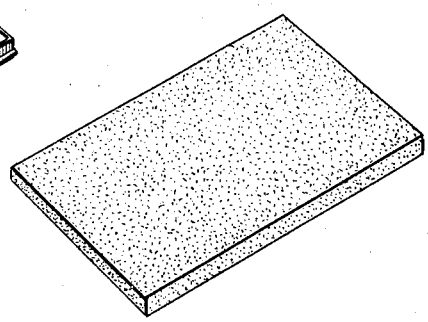
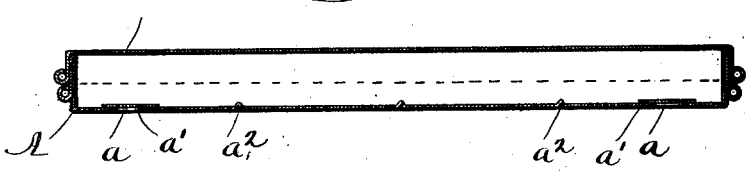
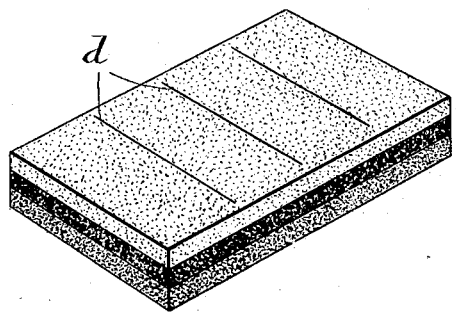
Witnesses:
Torris H. Alfords
Alberta Adamick
Inventor:
Peter Marine,
By Fred Gerlach
his Attorney

UNITED STATES PATENT OFFICE.

PETER MARINE, OF CHICAGO, ILLINOIS.

ART OF MAKING FROZEN CONFECTIONS.

SPECIFICATION forming part of Letters Patent No. 692,323, dated February 4, 1902.

Application filed May 3, 1901. Serial No. 58,563. (No specimens.)

*To all whom it may concern:*

Be it known that I, PETER MARINE, a resident of Chicago, in the county of Cook and State of Illinois, have invented certain new and useful Improvements in the Art of Making Frozen Confections, of which the following is a full, clear, and exact description.

The invention relates to the making of ice-cream and frozen ices of the kind commonly known as "layer" ice-cream—*i. e.*, that which is composed of layers or superposed parts of different flavors or kinds. Heretofore it has been a common practice to make this kind of confection by placing the several layers in a single mold and then again freezing the composite confection while in the mold. The layers were placed successively in the mold and each was tamped and firmly packed therein before the next layer was placed in the mold. Such tamping and packing were necessary to prevent the several layers (usually in partially frozen and soft state) from commingling with each other and from becoming "streaky." Frozen confection thus made was objectionable, because the firm packing and tamping necessary to prevent commingling of the several layers resulted in giving to the confection an unnecessary and very undesirable density. A further objection to this method was that a particular combination of layers of different flavor or character could not be altered after such were placed in the mold. The present invention designs to overcome these objections to the method now in common use and to provide an improved method of making frozen confection composed of several layers of different flavors, whereby the necessity of firmly packing the confection is entirely avoided, and, further, to provide an improved method whereby the several layers need not be placed together until the composite confection is to be packed for shipment or consumed, thus making it possible to quickly supply the demand for any particular combination of flavors.

With these objects in view the invention consists in the improvements hereinafter described, reference being had to the accompanying drawings, and more particularly defined by claims at the conclusion hereof.

In the drawings, Figure 1 is a perspective view of a mold (the cover being removed) used in carrying out the improved method. Fig. 2 is a view in central longitudinal section of the mold. Fig. 3 is a perspective view of a layer of confection, showing the form in which it is taken from the mold. Fig. 4 is a perspective view of a block of composite confection in readiness to be cut and wrapped for shipment or consumption.

It will be understood that the confection of which the layers of the composite confection is to be made is first congealed by an ice-cream freezer of any suitable construction. The congealed confection is then spread in a pan or mold A, such as shown in Fig. 1. The mold A is of sufficient depth to contain material to form a single layer and generally of sufficient area to form a layer which can be cut into sections for several blocks, that shown being designed to form four layer-sections of a single flavor. The pan A is preferably provided with ridges $a^2$, which make a slight impression in the material and indicate where the layer should be cut to form a layer-section. The bottom of the pan is also provided with finger-holes $a\ a$. Before the material is placed in the pan these holes are covered with a piece of paraffin-paper or the like to prevent the material from escaping therethrough. When the pan has been filled, a cover A' is placed over the pan, and the pan is then subjected to the action of a refrigerant until the material has "ripened" or set and until a composite confection is to be packed. The mold is then dipped into hot water to free the frozen material from the walls of the mold. When this has been done, the removal of the frozen material can be expedited, and unnecessary heating may be avoided by pressing the fingers against the closures $a'$, which will separate the material from the bottom of the pan and allow air to gradually pass between the material and the bottom of the pan. The layer of confection when removed from the mold will appear as shown in Fig. 3.

It will be understood that each layer of variously flavored and congealed cream, custard, or ice will be molded separately, as hereinbefore described, and will be allowed to ripen or set in a separate mold. The molded layers of desired and different flavors will then be superposed, and the block will appear as shown in Fig. 4. If desired to make a number of blocks of the same flavors, the material will be cut at the impressions made by the ridges $a^2$, as shown at $d$, when the blocks may be wrapped as usual and will then be ready for shipment or consumption. If but a single block of unusual combination—e. g., two layers of one flavor and one of a different flavor—is desired, the layer-sections may be cut before the layers are superposed. Thus it will be seen that the firm packing of the material, which in prior methods has resulted in the production of frozen confections of objectionable density, is entirely avoided, the density attained by the present method being the same as that of ice-cream and frozen ices produced by the same method employed for frozen confection made in bulk or that of a single flavor.

Another important resultant advantage of the improved method is that a material saving of labor is effected, since the material can be quickly spread in the pans and the time heretofore necessary in packing the material is saved.

A further advantage of the invention is that it permits the layers to be assembled after the material has been refrigerated and set, and consequently any combination of flavors may be embodied in a block according to demand or desire. This economical advantage is of much importance.

The advantages of employing the finger-openings in the pans are that the mold need not be heated to such extent as to materially soften the edges of the layer and so the layers will be of uniform shape and size and fit together.

A further objection to the old method was that the density of the confection varied according to the degree of firmness with which the material was packed, and, furthermore, the material was usually pressed into the mold by hand. The resultant product of the present method is always of uniform density and does not come in contact with the hands.

Having thus described my invention, what I claim as new, and desire to secure by Letters Patent, is—

1. That improvement in the art of making frozen confections composed of a plurality of layers, which consists in molding the congealed material for each layer separately, then refrigerating the said materials and then assembling layers of different flavor or character to form a composite confection.

2. That improvement in the art of making frozen confections composed of a plurality of layers, which consists in molding the congealed material for each layer separately and of sufficient size to form a plurality of layer-sections, then refrigerating the said materials, and cutting the layers into sections and assembling the layers to form a composite confection.

3. That improvement in the art of making frozen confections composed of a plurality of layers, which consists in molding the congealed material for each layer separately and of sufficient size to form a plurality of layer-sections, then refrigerating the said materials, then superposing the layers and then cutting the assembled layers to form blocks of composite confection.

PETER MARINE.

Witnesses:
FRED GERLACH,
TORRIS H. ALFORDS.